INVENTOR.
THOMAS HUTSON, JR.
BY
ATTORNEYS

Sept. 17, 1968  T. HUTSON, JR  3,402,216
OLEFIN PRODUCTION
Filed Dec. 27, 1966  2 Sheets-Sheet 2

INVENTOR.
THOMAS HUTSON, JR.
BY
ATTORNEYS

United States Patent Office
3,402,216
Patented Sept. 17, 1968

3,402,216
OLEFIN PRODUCTION
Thomas Hutson, Jr., Bartlesville, Okla., assignor to Phillips Petroleum Company, a corporation of Delaware
Continuation-in-part of application Ser. No. 545,092, Apr. 25, 1966. This application Dec. 27, 1966, Ser. No. 605,047
3 Claims. (Cl. 260—683.2)

ABSTRACT OF THE DISCLOSURE

Saturated alicyclic hydrocarbons are converted to selected olefins with high selectivity by photochlorinating said hydrocarbons, dehydrochlorinating the resultant monochlorinated hydrocarbons to produce monoolefins, recovering the selected monoolefins and recycling the remaining monoolefins to extinction through isomerization to convert the same to the selected monoolefin.

---

Figure 1:
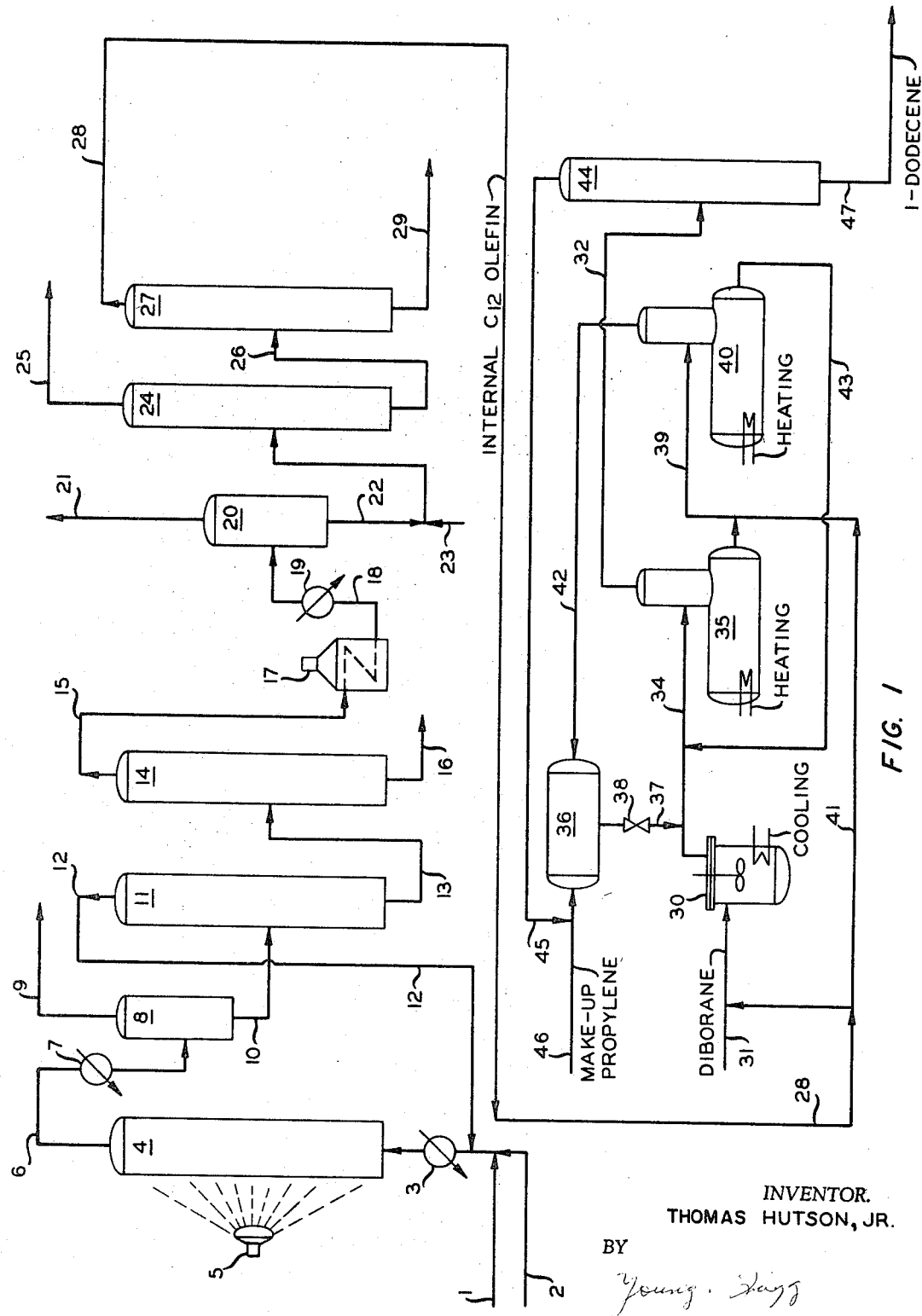

This application is a continuation-in-part of my copending application Ser. No. 545,092, filed Apr. 25, 1966.

This invention relates to the production of olefins. In one aspect, hydrocarbons are photochlorinated, dehydrohalogenated and isomerized to form selected olefins. In another aspect, saturated hydrocarbons are photochlorinated and dehydrohalogenated and the resultant internal olefins are isomerized to form terminal monoolefins. In another aspect, internal olefins are produced to the exclusion of 1-olefin by isomerizing the 1-olefins produced by alkyl halide dehydrochlorination. In yet another aspect, alkanes having from about 7 to about 15 carbon atoms per molecule are photochlorinated and dehydrohalogenated and the resultant internal olefins are isomerized to terminal olefins by hydroboration-displacement.

Numerous methods have been utilized for the production of olefins from saturated hydrocarbon compounds. However, the selectivity of the processes known in the art to the production of 1-olefins is such that substantial fractionation and recycle operation are required to obtain an economically feasible degree of conversion of feed hydrocarbon to the desired olefin. As disclosed in said copending application, a higher degree of selectivity to the required intermediate and end products can be achieved so that product separation and recycle operations are minimized. Consequently, through the unique combination of highly efficient chlorination, dehydrochlorination and isomerization operations, in addition to the provision for intermediate separation and recycle, the present invention provides for a process for the production of 1-olefins from saturated hydrocarbons at conversion levels not heretofore obtainable. I have now found that internal olefins can similarly be produced to the exclusion of 1-olefins thereby providing a process of high selectivity and flexibility.

It is therefore an object of this invention to provide for the production of olefins from saturated hydrocarbon compounds.

It is another object of this invention to provide for a process and apparatus for the highly specific production of terminal olefins.

It is another object of this invention to provide for a process and apparatus for the production of either internal or terminal olefins or both olefins from alkanes in high yields.

Other advantages, objects and aspects of this invention will be apparent to one skilled in the art in view of the disclosure, drawings and the appended claims.

In accordance with one embodiment of this invention, suitable hydrocarbon compounds are converted to 1-olefins by the several serial steps of photochlorination, dehydrochlorination and isomerization. More particularly in accordance with this invention, suitable hydrocarbon compounds are photochlorinated at conditions that enhance the selectivity of the chlorination to the corresponding monochlorinated derivatives, the monochlorinated compounds are then dehydrochlorinated in the presence of a catalyst to form the corresponding monoolefins which are subsequently isomerized to convert the internal olefins present to the corresponding terminal olefin thereby effecting a high degree of conversion of saturated hydrocarbon feedstock to terminal olefin product. Alternatively, internal olefins can be recovered as product following dehydrohalogenation and the 1-olefin can be isomerized with known isomerization catalysts to produce internal olefins. In this latter procedure 1-olefins can be recycled to isomerization to effect essentially complete conversion to internal olefin if desired.

More specifically in accordance with one embodiment of this invention, saturated hydrocarbons are photochlorinated and the reactor effluent is fractionated to resolve and recover unreacted feed hydrocarbon and mono- and dichlorinated derivatives. Unreacted hydrocarbon is recycled to the photochlorination zone, dichlorinated derivatives are removed from the system and monochlorinated hydrocarbons are dehydrochlorinated in the presence of a catalyst to effect a high degree of conversion to the corresponding olefins. The effluent from the dehydrochlorination operation comprising unconverted monochlorinated hydrocarbons, HCl, and internal and terminal olefins is fractionated to resolve and recover the several constituents whereby the unconverted monochlorinated hydrocarbons are recycled to the dehydrochlorination operation, HCl is vented from the system, terminal olefin is recovered as product and internal olefin is passed to an isomerization operation wherein it is converted to the corresponding terminal olefin. The feed from the isomerization operation comprising terminal and internal olefin is fractionated to resolve these two constituents whereby the internal olefin is recycled to the isomerization operation and the terminal olefin is recovered as product.

I have also found that considerable advantage and flexibility can be accomplished by providing the facility in this process for recovering internal olefin from the dehydrochlorination operation as product and passing the 1-olefin to a conventional isomerization zone wherein the 1-olefin is converted to an equilibrium mixture of internal olefin and 1-olefin. This mixture can then be fractionated to recover internal olefin as product and 1-olefin as recycle to the isomerization zone.

The halogenation and, particularly, the chlorination of hydrocarbons has been accomplished in both gaseous and liquid phases by various means. Light and, particularly, ultraviolet light is a known catalyst for the chlorination of paraffin hydrocarbons. However, the production of a monohalogenated hydrocarbon without substantial concurrent production of more highly chlorinated derivatives has been difficult due to the fact that the halogenation reaction occurs stepwise and is not generally equilibrium limited. Therefore, given sufficient residence time and sufficient halogen, particularly chlorine, at reaction conditions, the reaction product will contain no monohalogenated derivatives at all. For the purposes of the present invention, it is highly desirable to promote the selective conversion of saturated hydrocarbon feedstock to the corresponding monohalogenated derivative while substantially limiting conversion to more highly halogenated derivatives. It is therefore preferred in the process of this invention, to employ as the photochlorination step the process described in copending Ser. No. 248,543. Briefly, in the process of that invention, a liquid hydrocarbon stream such as n-heptane is treated in several serial photochlorination zones wherein the hydrocarbon, saturated with halogen, is subjected to ultraviolet radiation of sufficient intensity to provide for substantial utilization of the halogen present in each stage. Where chlorine is employed as the halogen, HCl is produced in each reactor and is removed from the reactor effluent by flashing. The resultant mixture of unconverted and halogenated feed hydrocarbon is contacted with additional halogen and cooled before exposure to ultraviolet radiation at halogenating conditions in a subsequent photochlorination zone wherein additional conversion to chlorinated hydrocarbon takes place. Through such a mode of operation the reaction temperature is kept low and the amount of halogen present is maintained considerably below a stoichiometric equivalent which conditions provide for a high degree of selectivity to the production of monochlorinated derivatives. The effluent from the photochlorination zone is fractionated to recover unconverted hydrocarbon which is recycled to the photochlorination zone, monochlorinated hydrocarbons which are passed to the subsequent dehydrochlorination operation and more highly halogenated derivatives which are removed from the system.

The dehydrohalogenation conditions employed in the process of this invention are desirably such that conversion of the chlorinated hydrocarbons to olefin is accomplished with only a minimum production of undesirable by-products. It is known that in many cases such reactions can be thermally initiated. Thus, heating at elevated temperatures is frequently sufficient to split-off the hydrogen halide from the molecule with the consequent production of olefin. However, for greater convenience and for the purpose of eliminating undesirable side reactions, it is preferred to accomplish the dehydrohalogenation at relatively low temperatures while enhancing the conversion rate by conducting the reaction in the presence of a suitable catalyst. A number of such catalysts have been disclosed in the art such as metals, metal salts, and other composites containing refractories, clays, alloys, and the like. Although many of these methods of dehydrochlorination can be employed to accomplish the desired function in the process of this invention, it is presently preferred that the dehydrochlorination be conducted in the presence of high surface oxidized carbon or pelleted diatomite in conjunction with a ceramic binder at a temperature in the range of from about 750 to about 850° F. In one embodiment the effluent from the dehydrochlorination operation comprising HCl, terminal olefin, internal olefin and possibly some unconverted halogenated hydrocarbon is fractionated to remove HCl from the system, to recover terminal olefin as product and unconverted halogenated hydrocarbon as recycle to the dehydrochlorination operation. In this embodiment the internal olefins recovered in such fractionation operations are passed to a subsequent isomerization operation wherein they are converted to the desired 1-olefin.

In practicing the isomerization operation employed in the process of this invention, it can be any one of numerous methods that have been found effective for converting internal olefins to terminal olefins and vice versa. The isomerization of olefins is a well known phenomena. The double bond present in olefinic hydrocarbons is rather labile and, accordingly, it can be caused to shift under suitable conditions.

Methods well known in the art, however, have generally required that the isomerization of the olefinic unsaturation to the terminal position requires rather high temperatures to accomplish any substantial degree of conversion. Such high reaction temperatures, generally in excess of 700° F., result in undesirable thermodecomposition of feed and products alike with the consequent production of coke and gaseous by-products which undesirably affect the overall operation and particularly the isomerization yield. It is, therefore, preferred in one embodiment of the present invention to employ as the isomerization step, a mode of operation that does not require the excessively high temperatures that result in the above-described disadvantages. The presently preferred mode of isomerization is the hydroboration-displacement technique described by H. C. Brown and G. Zweifel, Journal of American Chemical Society, 82, 1504, 1960. Generally, this technique involves the reaction of hydrogenboride with the internal olefin to produce the corresponding trialkylborane which is isomerized at from about 100° C. to about 175° C. to produce the corresponding terminal boronalkyl. This terminal alkyl is then contacted with displacement 1-olefin used in excess in the league of 160° C. to displace the boron from the alkyl radical with the consequent production of the desired terminal olefin.

When the production of internal olefins is preferred, another mode of isomerization is desirable. In this instance the 1-olefin can be contacted with a clay isomerization of which numerous variations are known in the art. For example, suitable catalysts are those disclosed in U.S. 2,613,233. Such isomerization is usually conducted in a packed column, the packing of which may be the isomerization catalyst or suitable refractory or other column packing impregnated with the catalyst. Catalysts which are suitable for this purpose are Floridin, kaolin, diatomaceous earth, bauxite, activated alumina, silica gel, or the like, or the same materials or inert support material such as pumice, impregnated with a slight amount of acid, such as sulfuric or phosphoric, or with acidic sulfate, phosphate, fluoride, or like salts of the alkali, alkaline earth, or other inorganic elements.

A more complete understanding of the concept of the present invention can be obtained by reference to the attached drawings which show in schematic form the several features of photochlorination, dehydrochlorination, and isomerization as well as the required and preferred fractionation, recycle, and recovery facilities.

Figure 2:
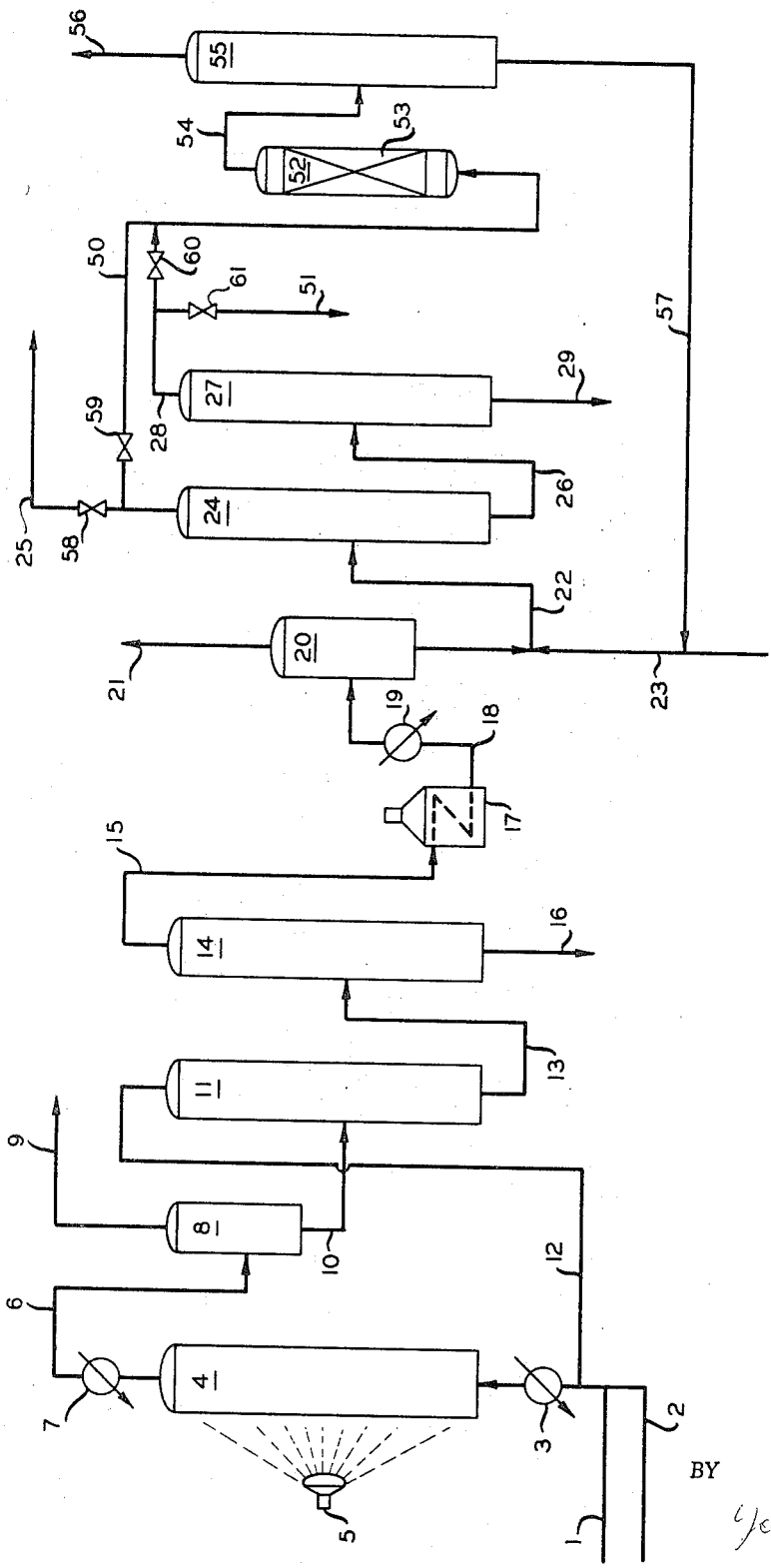

In the drawings, FIGURE 1 is a schematic of apparatus suitable for effecting the concept of this invention, including hydroboration displacement. FIGURE 2 illustrates a similar scheme wherein a simpler isomerization system is employed.

Referring now to FIGURE 1, the hydrocarbon feed to be converted to olefin is passed by way of pipe 1 and cooler 3 to photochlorination zone 4. Prior to its introduction into the photochlorination zone, the hydrocarbon feed is admixed with chlorine which is introduced by way of pipe 2. The photochlorination can be conducted in several serial stages as previously described or can be conducted in a single stage in the presence of high concentrations of chlorine and high intensities of ultraviolet radiation depending upon the selectivity of conversion to monochlorinated products desired. In the photochlorination zone, the mixture of hydrocarbon and chlorine is subjected to ultraviolet radiation from a suitable source 5 having a wave length of from about 2500 A. to about 6000 A. at a temperature of from about 40 to about 280° F. for a reaction time of from about 5 to about 25 seconds in each reactor where one or more stages are employed.

In such operations the preferred hydrocarbon feedstock is a normal alkane having from about 7 to about 15 carbon atoms per molecule in which case a pressure from about 40 to about 60 p.s.i.g. is required at chlorination conditions to maintain liquid phase. In the presently preferred mode of operation, the amount of chlorine added to the photochlorination zone is that required to give the desired conversion of hydrocarbon. Under such conditions, the residence time of preferably about 15 seconds in each serial chlorination zone is sufficient to provide for the conversion of substantially all of the halogen present. It should be pointed out that although a wide range of hydrocarbon feedstocks can be employed in the concept of this invention it is presently desirable for reasons of operability and product distribution to substantially limit the hydrocarbon feed to no more than two adjacent homologues of the alkane series, and it is generally preferred to employ a hydrocarbon feedstock comprising primarily only one member of the alkane series within the range above-noted.

The effluent from the photochlorination zone comprising HCl, unconverted hydrocarbon, mono- and dichlorinated derivatives is passed by way of pipe 6 and cooler 7 to flash drum 8 wherein the HCl is removed as overhead by way of pipe 9 and vented from the system. The remaining hydrocarbon phase having therein only a negligible amount of HCl is removed by way of pipe 10 and passed to fractionation column 11 wherein unreacted hydrocarbon is removed as overhead product by way of pipe 12 and recycled into admixture with the fresh feed to the photochlorination zone. Bottoms product comprising primarily chlorinated hydrocarbons is passed by way of pipe 13 to distillation column 14 wherein the monochlorinated derivatives are removed as overhead by way of pipe 15 and more highly halogenated derivatives are removed from the system by way of pipe 16. The monohalogenated derivatives are passed by way of pipe 15 to dehydrochlorination zone 17 wherein they are contacted with a suitable dehydrochlorination catalyst at a temperature of from about 750 to about 850° F. The catalyst employed in this operation can be any that will achieve a substantial degree of conversion to the desired products, and in the presently preferred embodiment of this invention either oxidized carbon or diatomite in conjunction with a ceramic binder can be employed. Where diatomite is employed, it has been found advantageous to treat the catalyst material before its introduction to the dehydrochlorination zone with a 10 percent aqueous solution of potassium hydroxide. Where dodecane is employed as the hydrocarbon feed to the photochlorination zone and the liquid hourly space velocity in the dehydrochlorination zone is maintained in the range from about 0.5 to about 2.0 the conversion of monohalogenated derivative to the corresponding olefin is in the range of about 95 to about 99 percent with a selectivity to n-dodecane-1 of about 95 to about 99 percent.

The effluent from the dehydrochlorination zone comprising HCl, 1-olefin, and internal olefins is passed by way of pipe 18 and cooler 19 to a suitable flash vessel 20 wherein HCl is removed as overhead through pipe 21 and vented from the system. The remaining hydrocarbon phase comprising primarily olefinic hydrocarbon is removed by way of pipe 22 and can be admixed, in one embodiment, with recycle internal olefin from the isomerization zone hereinafter detailed. In this embodiment the mixed feed is introduced to a suitable fractionation zone 24 wherein terminal olefin product is removed as overhead by way of pipe 25 and internal olefin along with a small amount of high molecular weight material produced in the dehydrochlorination zone is removed as bottoms product by way of pipe 26. This mixture is further fractionated in a suitable fractionation zone 27 wherein internal olefin is removed as overhead product and relatively high molecular weight materials are removed from the system by way of pipe 29.

The internal olefins are passed by way of pipe 28 to a suitable stirred reactor 30 wherein they are contacted with a solution of diborane in diglyme, which is the dimethylether of diethylene glycol, supplied to the reactor by way of pipe 31. In the presently preferred embodiment of this invention, a reaction time of about 30 seconds at 20° C. is employed in reactor 30 to effect the production of the desired borane derivative. This derivative is then passed by way of pipe 34 to a suitable fractionator 35 which in this embodiment comprises fractional distillation apparatus operated under heavy reflux at a preferred temperature of 180° C. for an average residence time of from about 1 to about 3 hours in order to effect the isomerization of the internal olefin to 1-olefin. Propylene, in an amount in excess of the stoichiometric quantity required to displace the olefin present in column 35, is passed from accumulator 36 via pipe 37 as controlled by suitable valve means 38 into admixture with the borane derivative from stirred reactor 30 and is then passed to column 35 to displace the 1-dodecene. The 1-dodecene thus displaced and the excess propylene present in column 35 are passed as overhead by way of pipe 32 while propylene borane is removed as kettle product from column 35 by way of pipe 39 and is introduced to column 40. A part of the internal olefins passing through pipe 28, sufficient to displace propylene from the propylene borane, is passed by way of pipe 41 into admixture with the propylene borane in column 40. The propylene thus displaced is recovered as overhead product from fractionator 40 and is passed by way of pipe 42 to accumulator 36. In the presently preferred embodiment of this invention, the average residence time of the latter described displacement step effected in column 40 is about 1 hour. Similar to the operation of column 35, column 40 is also operated under heavy reflux in the presently preferred mode of operation. Bottoms product from column 40, comprising tridodecylborane and diglyme is recycled to isomerization column 35 by way of pipe 43. The overhead product from column 35, comprising 1-dodecene product and excess propylene, is passed by way of pipe 32 to fractionator column 44, in which the propylene and 1-dodecene are separated; the propylene being recovered as overhead product and passed by way of line 45 to accumulator 36, and product 1-dodecene being recovered as bottoms product by way of pipe 47. Make-up propylene is supplied to accumulator 36 by way of pipe 46 to accommodate for losses in the operation.

The hydroboration is preferably carried out in the presence of 10 to 20 percent excess hydride to insure the quantitative utilization of olefin. The use of a suitable solvent such as diglyme (diethylene glycol monomethyl ether) is preferred. However, the quantity of hydride employed can be varied as desired depending upon degree of conversion, residence time and reaction temperature. It has been found that the conversion of higer molecular weight internal olefins to the corresponding terminal olefins is substantially slower than the conversion rates of relatively lower molecular weight compounds. It has also been found that the rate of conversion can be substantially increased at higher temperatures in the range of 150° C. However, in the presently preferred embodiment of this invention, the hydroboration reaction is carried out at a temperature from about 75 to about 100° C. and for a residence time of from about 1 to about 3 hours. Higher ultimate conversions are, of course, obtained with longer residence times and higher concentrations of boronhydride. However, it has been found that in the preferred range of operating conditions wherein internal dodecenes are employed as the olefin feed to hydroboration zone and reaction conditions are maintained at about 100° C. and from about 1 to about 3 p.s.i.g. with an excess boronhydride of about 20 percent that the yield of terminal olefin based on feed olefin is in the league of 98 percent. Within the range of operating conditions noted, the ultimate conversions generally achieved are within the range of about 75 to about 98 percent.

This boron displacement is accomplished in the presence of an excess of terminal displacement olefin such as tetradecene-1 which has been found suitable for this purpose wherein the boron alkyl is tridodecylboron. Preferably, because of ease of separation, propylene can be used as the displacement olefin. Theoretically, only a stoichiometric equivalent of displacement olefin is required to achieve the desired conversion to the desired terminal olefins. However, it has been found that the presence of about 15 to about 25 molar excess displacement olefin in the displacement reactor greatly enhances the conversion rate and ultimate yield. In one embodiment, as shown in the drawing, the displacement olefin can be admixed with the boron alkyl feed to the displacement zone prior to the introduction of the thus-formed mixture into the reactor. However, suitable conversions can be obtained by introducing these two components to the displacement zone as separate streams. It has been found that the rate of the displacement reaction is enhanced at higher temperatures and that suitable conversions can be achieved at temperatures within the range of from about 125 to about 175° C. However, in the presently preferred embodiment of this invention, wherein dodecane is employed as the feed to the above-described photochlorination zone the temperature in the displacement zone is maintained in the league of about 160° C. The pressure maintained during this operation need only be that required to maintain liquid phase reaction. It has also been found advantageous to provide suitable means for agitating the mixture during its residence in isomerization vessel 30. Residence times in the displacement zone are generally in the range of 0.5 to about 3 hours. However, it has been found that about 90 to about 95 percent conversion of tridodecylborane to terminal dodecene can be accomplished in the presence of 1500 percent excess propylene at about 160° C. where reaction is continued for a period of 2 hours.

Regeneration of the propylene used as displacement hydrocarbon is easily accomplished by contacting this boron alkyl with an equimolar quantity of internal $C_{12}$ olefin. This step is shown in vessel 40. Approximately one hour is required. The propylene is removed overhead and returned to propylene storage vessel. The tridodecyl borane is recycled to the isomerization reactor vessel 35.

The operation of the above-described fractionation zones need only be suitable to accomplish the required separations. However, it is preferred to maintain the pressure in both of these operations at a relatively low value generally in the range of atmospheric pressure or in an excess thereof for reasons that by such operation lower temperatures are required to accomplish the desired separation. These conditions will, of course, vary depending upon the molecular weight of the feed hydrocarbon and displacement olefin, but it is generally preferred to maintain the fractionation temperatures relatively low in order to avoid any substantial decomposition of the boron alkyls.

Where it is preferred to produce internal olefins to the exclusion of 1-olefins, the internal olefin can be recovered from the fractionation zones following dehydrochlorination and the 1-olefins can be passed to a conventional isomerization reactor and converted, at least in part, to internal olefins after which unconverted terminal olefins are separated and recycled to the isomerization reactor.

This alternate embodiment is illustrated in FIGURE 2 wherein 52 is a packed isomerization zone and 55 is a product fractionator. The vessels, sequence of operation and numbering of the photochlorination, intermediate fractionation and dehydrochlorination are as defined and described for FIGURE 1. Terminal olefin is removed as overhead from fractionator 24 and passed to isomerization zone 52 which is packed with suitable isomerization catalyst 53 as above described. The isomerization reactor is preferably operated within a temperature range of from about 120 to about 150° F. to convert at least part of the terminal olefin to internal olefin. The reaction product comprising a mixture of terminal and internal olefin is removed as overhead from isomerization zone via conduit 54 and is passed to fractionation or stripping means 55. Relatively low molecular weight materials produced in isomerization are removed from fractionator 55 as overhead by way of pipe 56. Heavier materials including the desired internal olefin and unconverted terminal olefin are removed as bottoms product by way of pipe 57 and recycled by way of pipe 23 as feed to fractionator 24.

As a result of such operations, the terminal olefin can be recycled to extinction thereby providing for the conversion of substantially all of the hydrocarbon feed to the desired internal olefin which is removed by way of pipe 51 from fractionator 27.

In producing internal olefins, as described immediately above, valves 58 and 60 will be closed, and valves 59 and 61 will be open. However, it is also possible to produce terminal olefins as the product and send the stream rich in internal olefins to the isomerization unit 52 for conversion, at least in part, to terminal olefins. In this latter case, terminal olefins will be removed as product from the overhead stream of fractionator 24. For the production of terminal olefins, valves 58 and 60 will be open, and valves 59 and 61 will be closed.

The aforegoing discussion and the attached drawings are only intended to be illustrative of one embodiment of this invention and the application of the concept of this invention in one particular instance and are not intended to limit the scope or the application of the concept of this invention.

Reasonable variation and modification are possible within the scope of the foregoing disclosure, drawing and claims, the essence of which is that there is provided a method and apparatus for converting hydrocarbon feedstocks to the corresponding olefins which method comprises photochlorinating the hydrocarbon in the presence of an ultraviolet light, dehydrochlorinating the monochlorinated hydrocarbons thus produced and subsequently isomerizing either the internal or terminal monoolefins produced in the dehydrochlorination operation to yield the desired olefin product.

I claim:

1. A method for producing selected monoolefins from saturated alicyclic hydrocarbons having from 7 to 15 carbon atoms per molecule which comprises photochlorinating said hydrocarbon in the presence of chlorine and ultraviolet radiation having a wave length of from about 2500 to about 6000 Angstroms at a temperature of from about 40 to about 230° F. to produce monochlorinated hydrocarbons containing some HCl, unreacted hydrocarbon, monochlorinated and dichlorinated hydrocarbons, fractionating this photochlorination effluent mixture in a first fractionation zone to separate said HCl as overhead, fractionating the bottoms product from said first fractionation zone comprising unreacted hydrocarbon, monochlorinated and dichlorinated hydrocarbons in a second fractionation zone to produce a second overhead comprising primarily said unconverted hydrocarbon thereby separating said unconverted hydrocarbon from said monochlorinated and dichlorinated hydrocarbons, fractionating the mixture of monochlorinated and dichlorinated hydrocarbons having substantially reduced concentration of said unconverted hydrocarbon to recover said monochlorinated hydrocarbon as overhead and said dichlorinated hydrocarbon as bottoms product, recycling said unconverted hydrocarbon as feed to said photochlorination step, dehydrochlorinating said monochlorinated hydrocarbon in a dehydrochlorination zone in the presence of a basic catalyst at a temperature of from about 750 to about 850° F. and a pressure of from about 40 to about 60 p.s.i.g. to convert said monochlorinated hydrocarbon to olefin hydrocarbons, fractionating the effluent from said dehydrochlorination zone comprising olefin, chlorinated hydrocarbon, HCl, terminal and internal olefins to produce a bottoms product comprising primarily said chlorinated hydrocarbon and recycling said chlorinated hydrocarbon as feed to said dehydrochlorination zone.

2. The method of claim 1 wherein the effluent from said photochlorination is flashed to remove HCl as overhead, the remainder is fractionated to produce unconverted hydrocarbon as overhead and chlorinated hydrocarbon as bottoms product, said unconverted hydrocarbon overhead is passed as recycle to said photochlorination, said chlorinated hydrocarbon bottoms product is fractionated to separate monochlorinated hydrocarbon as overhead and dichlorinated hydrocarbon as bottoms product, the effluent from said dehydrochlorination is flashed to remove HCl as overhead, the remainder comprising terminal and internal olefins is fractionated to recover said terminal olefin as overhead and internal olefins as bottoms product and wherein said hydrocarbon comprises primarily two adjacent homologs of the alkane series having from about 7 to about 15 carbon atoms per molecule.

3. The method of claim 1 wherein said hydrocarbon has from about 7 to about 15 carbon atoms per molecule, said photochlorination is effected in the presence of chlorine and ultraviolet radiation having a wave length of from about 2500 to about 6000 Angstroms at a temperature of from about 40 to about 230° F. to produce monochlorinated hydrocarbon, the product from said photochlrination comprising HCl, unreacted hydrocarbon, monochlorinated and dichlorinated hydrocarbon is fractionated to separate and recover said unconverted hydrocarbon and said monochlorinated hydrocarbon, said unconverted hydrocarbon is recycled to said photochlorination step, said monochlorinated hydrocarbon is passed as feed to said dehydrochlorination step, said dehydrochlorination is effected in the presence of a basic catalyst at a temperature of from about 750 to about 850° F. and a pressure of from about 40 to about 60 p.s.i.g. to convert chlorinated hydrocarbon to olefin, the product from said dehydrochlorination step comprising chlorinated hydrocarbon, HCl, terminal and internal olefin is fractionated to separate chlorinated hydrocarbon for recycle to said dehydrochlorination, internal olefin as product, and terminal olefin, said terminal olefin is passed as feed to said isomerization operation to convert at least a portion of said terminal olefin to internal olefin, the isomerization product from said isomerization operation comprising internal and terminal olefin is fractionated to recover said internal olefin as product and said terminal olefin is recycled to said isomerization operation and wherein said hydrocarbon comprises primarily two adjacent homologs of the alkane series having from about 7 to about 15 carbon atoms per molecule.

References Cited

UNITED STATES PATENTS

| | | | |
|---|---|---|---|
| 1,102,655 | 7/1914 | Graul | 260—683.2 |
| 1,202,282 | 10/1916 | Graul | 260—683.2 |
| 1,298,929 | 4/1919 | Graul | 260—683.2 |
| 2,613,233 | 10/1952 | Blumer | 260—683 |
| 1,975,456 | 10/1934 | Hass | 260—683.2 |
| 3,296,108 | 1/1967 | Hutson | 204—163 |
| 3,284,521 | 11/1966 | Fritz | 260—666 |
| 3,290,400 | 12/1966 | Schwarz | 260—666 |
| 2,243,191 | 5/1941 | Cantzler | 260—666 |
| 3,329,731 | 7/1967 | Holiday | 260—666 |

OTHER REFERENCES

Herbert C. Brown et al.: J. Amer. Chem. Soc., vol. 82, pp. 1504–5, 1960.

DELBERT E. GANTZ, *Primary Examiner.*

V. O'KEEFE, *Assistant Examiner.*